(12) United States Patent
Albrecht et al.

(10) Patent No.: US 8,937,783 B2
(45) Date of Patent: Jan. 20, 2015

(54) MAGNETIC DATA RECORDING SYSTEM WITH IMPROVED SERVO CAPABILITY FOR BIT PATTERNED RECORDING

(75) Inventors: Thomas R. Albrecht, San Jose, CA (US); Manfred E. Schabes, Saratoga, CA (US)

(73) Assignee: HGST Netherlands B.V., Amsterdam (NL)

(*) Notice: Subject to any disclaimer, the term of this patent is extended or adjusted under 35 U.S.C. 154(b) by 160 days.

(21) Appl. No.: 13/333,972

(22) Filed: Dec. 21, 2011

(65) Prior Publication Data

US 2013/0163111 A1 Jun. 27, 2013

(51) Int. Cl.
*G11B 5/02* (2006.01)

(52) U.S. Cl.
USPC .......................................... 360/59; 360/77.01

(58) Field of Classification Search
None
See application file for complete search history.

(56) References Cited

U.S. PATENT DOCUMENTS

| 6,075,664 | A | 6/2000 | Shimizu | |
|---|---|---|---|---|
| 7,480,924 | B2 | 1/2009 | Hattori et al. | |
| 7,483,230 | B2 | 1/2009 | Kuwamura | |
| 7,609,470 | B2 | 10/2009 | Yamazaki | |
| 7,660,059 | B2 | 2/2010 | Ahn et al. | |
| 7,848,048 | B1 | 12/2010 | Albrecht et al. | |
| 7,911,724 | B2 | 3/2011 | Buch et al. | |
| 7,916,417 | B2 | 3/2011 | Yamagishi | |
| 2008/0137224 | A1* | 6/2008 | Gao et al. | 360/55 |
| 2010/0027158 | A1* | 2/2010 | Takagishi et al. | 360/77.02 |
| 2010/0073819 | A1* | 3/2010 | Albrecht et al. | 360/135 |
| 2010/0118433 | A1 | 5/2010 | Buch | |
| 2010/0128382 | A1 | 5/2010 | Maeda et al. | |
| 2010/0265616 | A1 | 10/2010 | Ohtake et al. | |
| 2010/0277827 | A1 | 11/2010 | Wood et al. | |
| 2012/0069465 | A1* | 3/2012 | Sato et al. | 360/77.02 |
| 2013/0148228 | A1* | 6/2013 | Albrecht et al. | 360/55 |

FOREIGN PATENT DOCUMENTS

| JP | 11120638 A | 4/1999 |
|---|---|---|
| JP | 2007/115324 A | 5/2007 |
| JP | 2008/146688 A2 | 6/2008 |
| JP | 2010/152992 A | 7/2010 |

OTHER PUBLICATIONS

Smith et al., "Micromagnetics of magnetization reversal in pattern magnetic recording medium," 2006 Magnetics Conference, INTERMAG 2006, IEEE International, May 8-12, 2006, pp. 483.

* cited by examiner

*Primary Examiner* — Wayne Young
*Assistant Examiner* — Brian Butcher
(74) *Attorney, Agent, or Firm* — Zilka-Kotab, PC

(57) ABSTRACT

A magnetic data recording system wherein the wherein adjacent track interference during writing is avoided by modulating the size of a write bubble on the magnetic media in response to a position error signal. If the position error signal indicates that the magnetic head is off-track, circuitry within the magnetic data recording system adjusts the size of the write bubble temporarily to prevent the write bubble from encroaching on a neighboring data track. This adjustment of the write bubble can be accomplished by adjusting power to the write head. Adjustment of the write bubble can also be achieved by adjusting power to a magnetic oscillator in a microwave assisted magnetic recording system (MAMR) or adjusting power to a heating element in a thermally assisted magnetic recording system.

17 Claims, 16 Drawing Sheets

MAGNETIC DATA RECORDING SYSTEM WITH IMPROVED SERVO CAPABILITY FOR BIT PATTERNED RECORDING

FIELD OF THE INVENTION

The present invention relates to magnetic data recording and more particularly to a magnetic recording system employing adjustment of write bubble size to avoid adjacent track writing.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head can include a magnetic write pole and a magnetic return pole, the write pole having a much smaller cross section at the ABS than the return pole. The magnetic write pole and return pole are magnetically connected with one another at a region removed from the ABS. An electrically conductive write coil induces a magnetic flux through the write coil. This results in a magnetic write field being emitted toward the adjacent magnetic medium, the write field being substantially perpendicular to the surface of the medium (although it can be canted somewhat, such as by a trailing shield located near the write pole). The magnetic write field locally magnetizes the medium and then travels through the medium and returns to the write head at the location of the return pole where it is sufficiently spread out and weak that it does not erase previously recorded bits of data.

A magnetoresistive sensor such as a GMR or TMR sensor can be employed for sensing magnetic fields from the rotating magnetic disk. The sensor includes a nonmagnetic conductive layer, or barrier layer, sandwiched between first and second ferromagnetic layers, referred to as a pinned layer and a free layer. First and second leads are connected to the sensor for conducting a sense current therethrough. The magnetization of the pinned layer is pinned perpendicular to the air bearing surface (ABS) and the magnetic moment of the free layer is located parallel to the ABS, but is free to rotate in response to external magnetic fields. The magnetization of the pinned layer is typically pinned by exchange coupling with an antiferromagnetic layer.

When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode, the resistance of the spin valve sensor changes proportionally to the magnitudes of the magnetic fields from the rotating disk. When a sense current is conducted through the spin valve sensor, resistance changes cause potential changes that are detected and processed as playback signals.

Magnetic recording hard disks drives with patterned magnetic recording media have been proposed to increase data density. In a patterned medium, the magnetic recording layer on the disk is patterned into small isolated data islands arranged in concentric data tracks. To produce the required magnetic isolation of the patterned data islands, the magnetic moment of the spaces between the islands must be destroyed or substantially reduced to render these spaces essentially nonmagnetic. In one type of patterned media, the data islands are elevated, spaced-apart pillars that extend above the disk substrate surface to define troughs or trenches on the substrate surface between the pillars. The magnetic recording layer material is then deposited over the entire surface of the substrate to cover both the ends of the pillars and the trenches. The trenches are recessed from the tops of the pillars so they are far enough from the read/write head to not adversely affect reading or writing.

A magnetic disk drive also include servo electronics, designed to keep the read and write heads centered over a desired data track. If the read and write heads wander off of the desired data track, the servo electronics correct move the slider to back to the correct location over the desired track of data. However, because the components such as the actuator, suspension and slider have a certain amount of mass, it takes time to return the slider to the correct portion over the desired data track. During the time that it takes to correct the location of the slider over the data tracks, the write head can inadvertently write to an adjacent track, resulting in loss of data. Therefore, there remains a need for a system for preventing loss of data when the slider becomes offset from the desired data track. This system would preferably be virtually instantaneous in order to prevent the loss of data during implementation of the system.

SUMMARY OF THE INVENTION

The present invention provides a method for preventing adjacent track interference during writing in a magnetic data recording system by generating a position error signal and modulating a size of a write bubble based on the position error signal to avoid writing to an adjacent data track. This can be implemented in a magnetic disk drive system that includes, a magnetic media having a plurality of data tracks, a slider having a magnetic read head and a magnetic write head formed thereon, and an actuator connected with the slider to position the slider over a surface of the magnetic media. The magnetic disk drive system includes circuitry configured to generate a position error signal based on a signal from the read head, and circuitry configured to calculate a write bubble modulation based on the position error signal.

This can be implemented in a magnetic disk drive having a bit patterned media, and in a disk drive that is configured for hyper-track recording or shingled recording. The invention can also be implemented in a disk drive that is configured for microwave assisted recording (MAMR) or thermally assisted recording (TAR).

Whereas prior servo systems rely solely on servo processes that involve the movement of physical elements including the slider, suspension and actuator (which takes time to perform), the present invention is mass-less and therefore can be implemented virtually instantaneously to prevent the loss of data while the servo system corrects the path of the magnetic head

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE EMBODIMENTS

The following description is of the best embodiments presently contemplated for carrying out this invention. This description is made for the purpose of illustrating the general principles of this invention and is not meant to limit the inventive concepts claimed herein.

Figure 1:
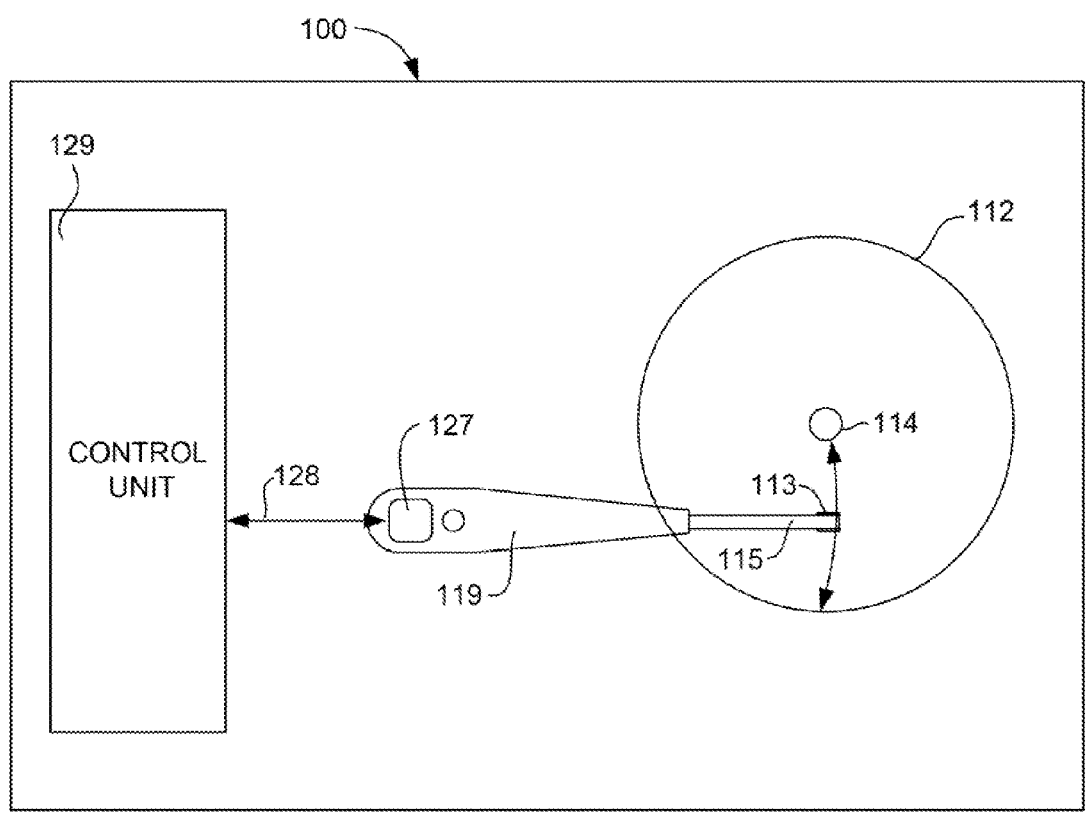
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113, having a magnetic head formed on its trailing edge, is positioned near the magnetic disk 112. As the magnetic disk rotates, slider 113 moves radially in and out over the surface of the disk 112 so that the magnetic head assembly of the slider 113 can access different tracks of the magnetic disk where desired data are written and read. Each slider 113 is attached to an actuator arm 119 by way of a suspension 115. The suspension 115 provides a slight spring force which biases slider 113 against the disk surface 112. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the surface of the disk 112 which exerts an upward force or lift on the slider. The air bearing thus counterbalances the slight spring force of suspension 115 and supports slider 113 off and slightly above the surface of the disk 112 by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as head position and seek control signals on line 128. The control signals on line 128 provide the desired current profiles to optimally move and position slider 113 to the desired data track on disk 112.

Figure 2:
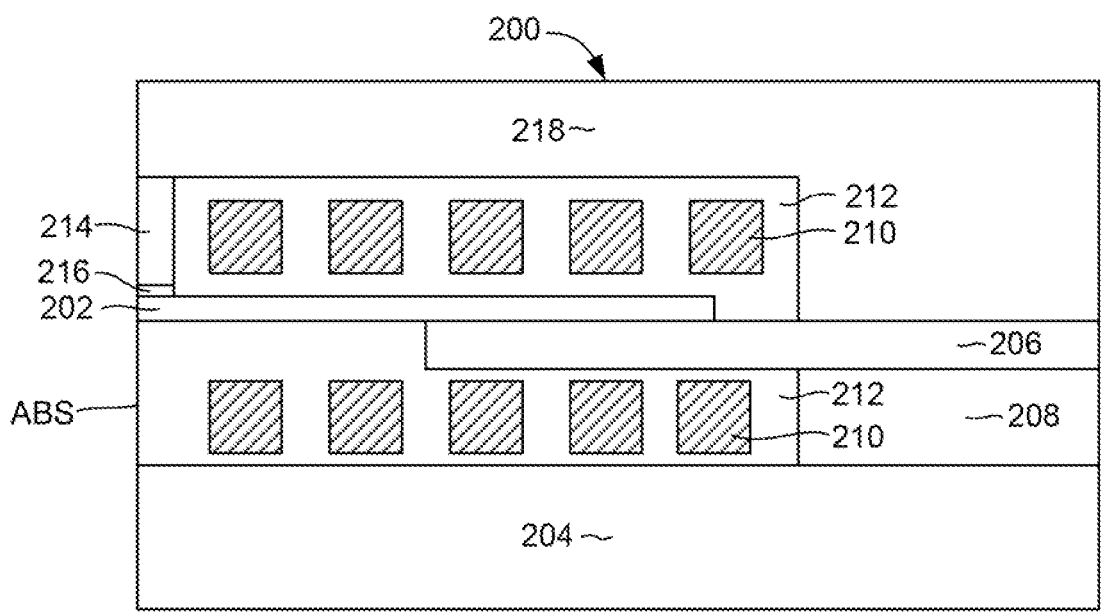
FIG. 2 is a side view of a prior art magnetic write head.

FIG. 2 shows a side view of a magnetic write head 200 according to the prior art as might be formed on the slider 113 described above. The write head includes a write pole 202 and a magnetic return pole 204, both of which extend to the air bearing surface (ABS). The write pole 202 has a cross section at the ABS that is much smaller than that of the return pole 204. The write pole 202 can be connected with a magnetic shaping layer 206 that helps to conduct magnetic flux to the write pole 202. The write pole 202 and shaping layer 206 are magnetically connected with the return pole 204 by a magnetic back gap layer 208 that is located away from the ABS. A non-magnetic, electrically conductive write coil 210 (shown in cross section in FIG. 2) passes between the write pole 202 and the return pole 204, and may also pass above the write pole. The write coil 210 can be embedded in a non-magnetic, electrically insulating fill material 212 such as alumina.

When a current flows through the write coil 210, a resulting magnetic field causes a magnetic flux to flow through the write pole 202, shaping layer 206, back gap layer 208 and return pole 204. This results in a write field being emitted from the tip of the write pole at the ABS. This write field travels through the magnetic media 212 (FIG. 1) to return to the return pole, thereby making a magnetic circuit. Because the write pole 202 has a cross section at the ABS that is much smaller than that of the return pole 204, the write field flux from the write pole 202 is highly concentrated and can write a magnetic bit to the magnetic media, whereas the magnetic field returning to the return pole 204 is spread out and weak and does not erase the previously recorded bit.

In order to increase the field gradient of the write field (and thereby confine the write field to the target bit) a trailing magnetic shield 214 can be provided adjacent to the trailing edge of the write pole 202. The trailing magnetic shield 214 is separated from the write pole 202 by a non-magnetic trailing gap 216. The trailing magnetic shield 214 can be connected with a trailing return pole 218, which helps to return magnetic flux from the trailing shield 214 to the back of the write head 200.

Figure 3:
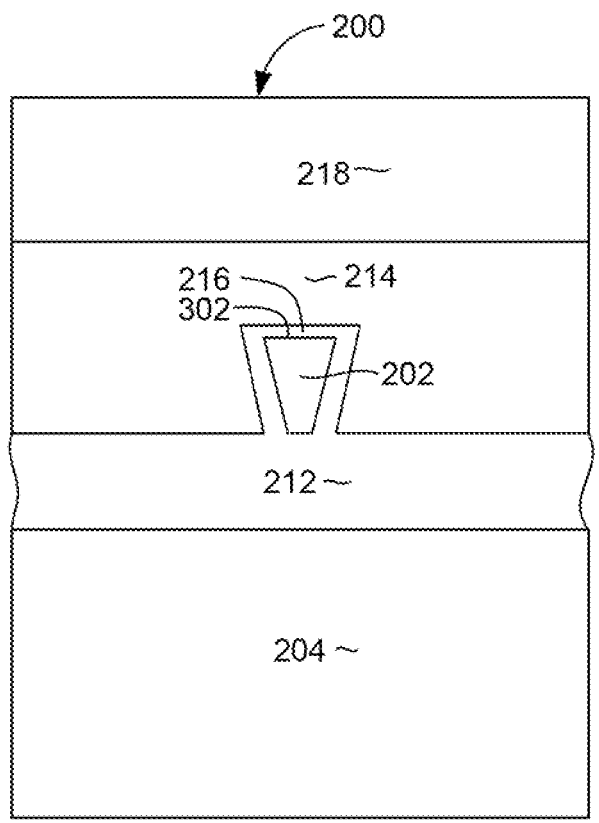
FIG. 3 is an ABS view of the magnetic write head of FIG. 2.

FIG. 3 shows an ABS view of a portion of the write head 200, and shows that the write pole 202 has a generally trapezoidal shape with tapered sides and a trailing edge 302 that is larger than the leading edge. This shape helps to avoid skew related adjacent track interference. Also as shown, the trailing magnetic shield 214 can be formed to wrap around the sides of the write pole. This can help to suppress stray field interference.

Figure 4:
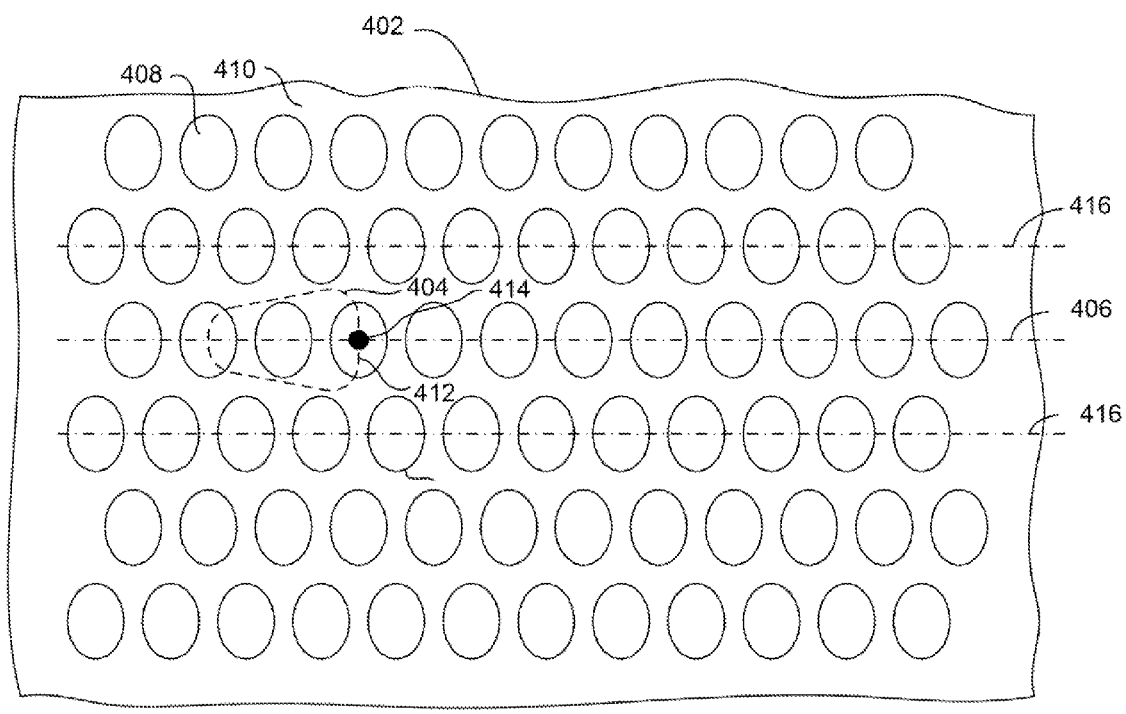
FIG. 4 is a top down view of a portion of a prior art bit patterned magnetic media.

FIG. 4 shows a top down view of a portion of a magnetic media 402. The magnetic media can be configured as a bit patterned media having magnetic islands 408 separated by non-magnetic spaces 410. The dashed line 404 indicates an area magnetized by the write pole 202 described above with reference to FIG. 2. This area 404, which can be referred to as a write bubble has a shape that generally resembles the trapezoidal shape of the write pole 202 as it was described above with reference to FIG. 3, however, the write bubble 404 may have rounded corners. The write bubble has a trailing edge 412 that corresponds with the trailing edge 302. This trailing edge of the write bubble 412 is the location at which writing occurs to the magnetic island 408 over which it is located at the time of writing. This location of writing is indicated by the solid dot 414.

As can be seen in FIG. 4, the write bubble 404 is centered over a data track 406. In order to ensure that writing occurs only at the desired data track 406 and that the writing does not inadvertently affect adjacent tracks 416, the write head 200 (FIG. 3) should be kept centered over the desired data track 406. In order to keep the write head 200 centered over the desired data track 406, the data recording system is provided with servo electronics that are capable of generating a position error signal. This position error signal is used to determine whether the radial location of the write head 200 should be adjusted, and this information is then fed to an actuator (e.g. voice coil motor 127 FIG. 1) to move the head 200 accordingly.

As will be appreciated, in order to adjust the radial location of the write head 200, it is necessary to radially move the slider 113 suspension 115, and actuator arm 119 (shown in FIG. 1). These structures, however, have a certain amount of mass. This means that adjusting the location of these elements takes time, which can result in errors such as adjacent track interference before the location of the write head 200 has been adjusted.

Figure 5:
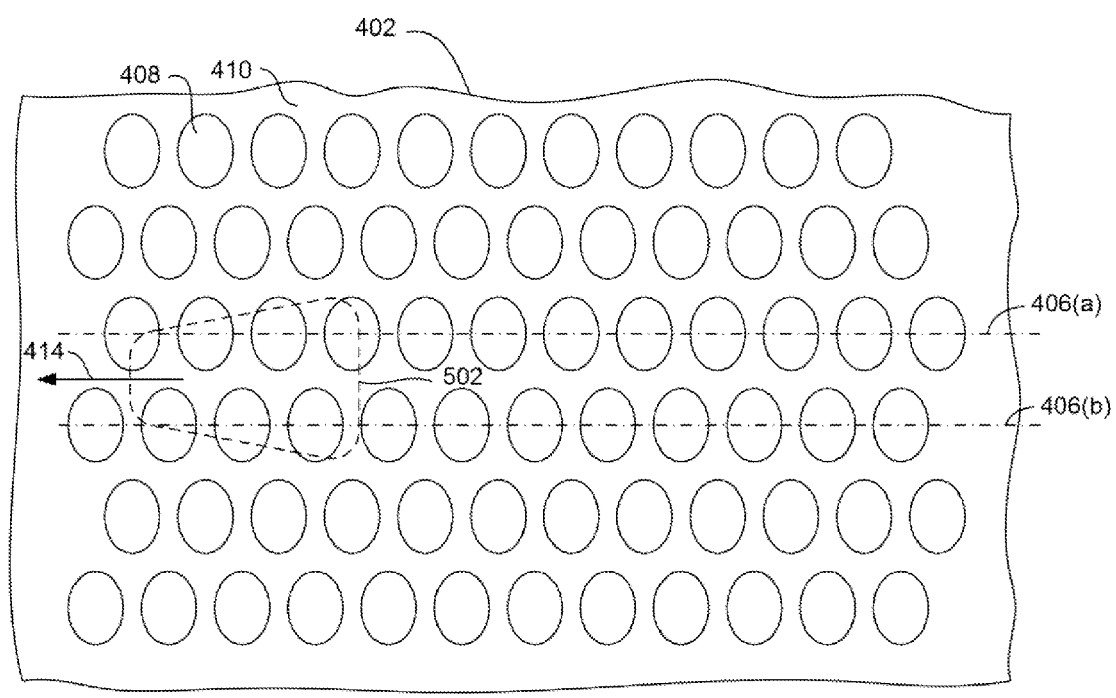
FIG. 5 is top down view of a portion of a portion of a bit patterned media as used in a hyper-track recording system.

With reference now to FIG. 5, another type of recording is what has been referred to as hyper-track recording. In a bit patterned media such as the media 402 having magnetic islands 408 separated by non-magnetic areas 410, the most efficient way to arrange the islands 408 for the greatest data density is to arrange the tracks (e.g. 406(a), 406(b)) so that each track is offset from its adjacent tracks. In other words, the island of one track is aligned with the space between islands of an adjacent track in a manner that resembles a hexagonal closed pack spacing of atoms in a crystal structure.

Hyper-track recording takes advantage of this arrangement of the data islands 408. In a hyper-track recording system, the write pole 202 (FIG. 2) is constructed large enough that the resulting write bubble 502 covers two data tracks. The signal processing electronics are configured to read both tracks in the same pass, reading a bit from on track 406(a) and then from the other track 406(b) and so forth in a zig-zag fashion. This form of writing allows the bits to be spaced closer together, and increases data density and recording speed.

Figure 6:
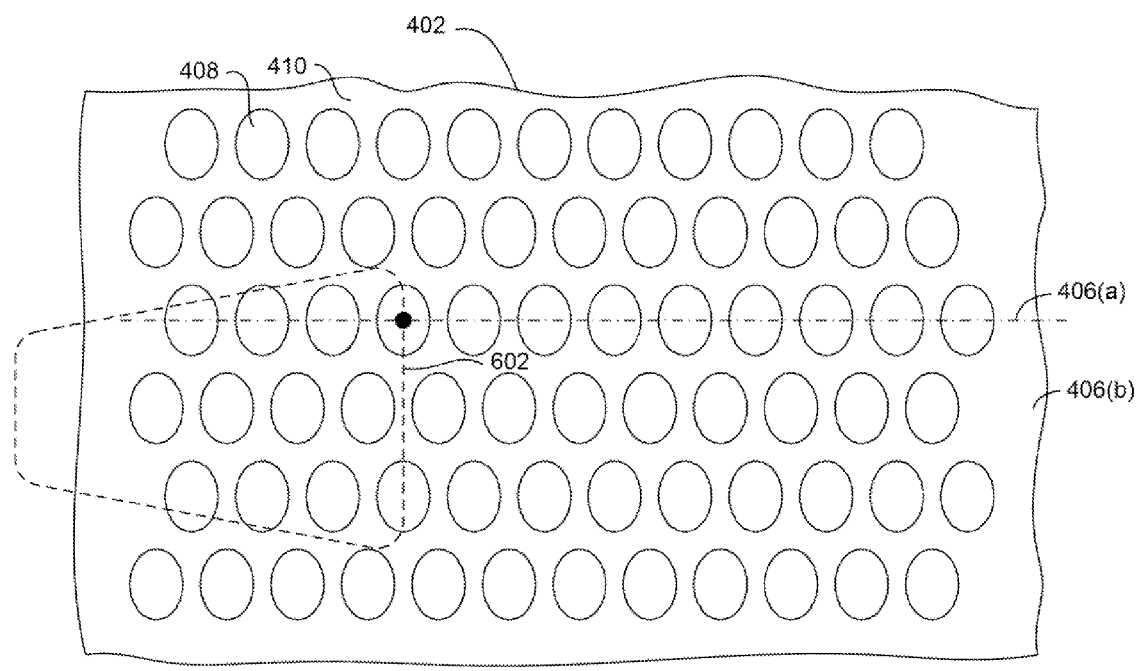
FIG. 6 is a top down top down view of a portion of prior art bit patterned media as used in a shingled magnetic recording system.

With reference now to FIG. 6 yet another type of magnetic recording system employs a method that has been referred to as "shingled" recording. In this system, the magnetic head 202 (FIG. 2) is large enough that the write bubble 602 covers several tracks of data. However, on one track (e.g. 406) is being written to. In this case, writing occurs only at one edge of the write bubble (the top edge in the example shown in FIG. 6). This method is called shingled writing, because the write bubble overlaps other tracks that will subsequently be recorded by the outer edge of the write bubble.

Figure 7:
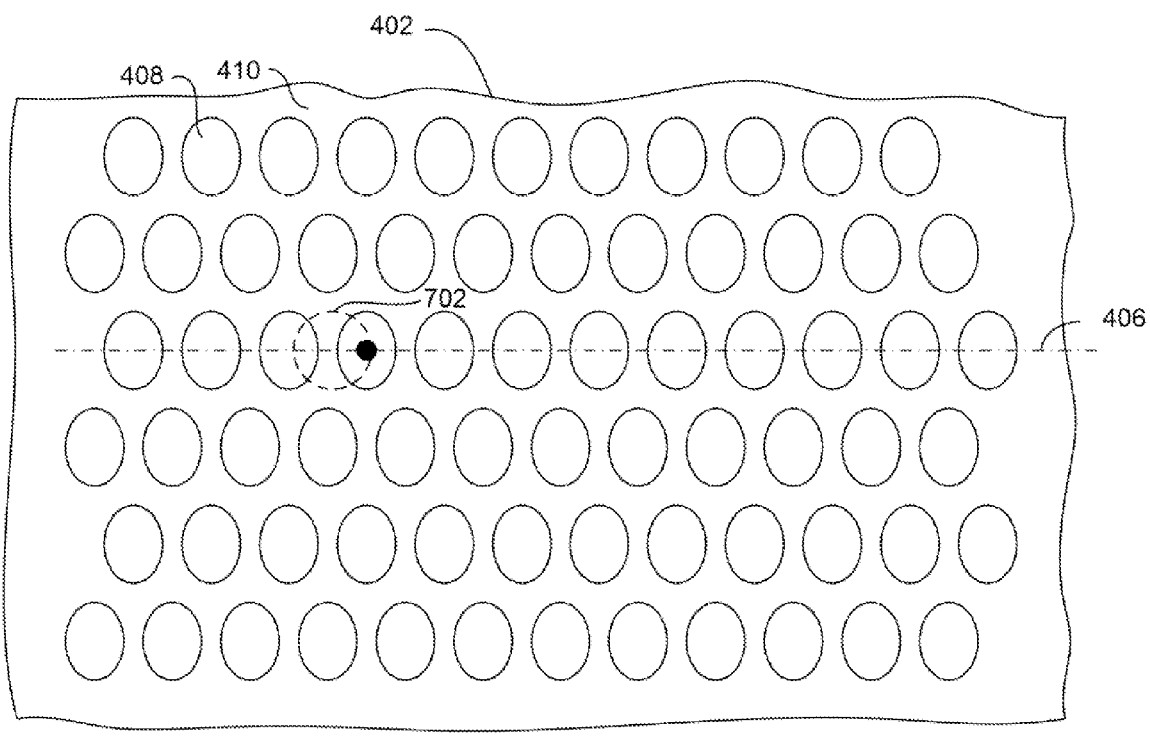
FIG. 7 is a top down view of a portion of a prior art bit patterned media as used in a thermally assisted magnetic recording system.

Still another type of magnetic recording is thermally assisted magnetic recording. In such a system, the magnetic head incorporates a heating element such as a laser diode. This heating element locally heats the magnetic media just prior to writing. This heating temporarily lowers the magnetic coercivity of the media allowing the media to be more easily written to. The media subsequently cools, increasing the coercivity of the media and making it stable. In this type of recording head, the shape of the write bubble 702 is determined by the thermal heating spot rather than by the shape of the write pole. Therefore, the write bubble 702 tends to be round as shown in FIG. 7. Additionally there are variations of thermally assisted recording which utilize a relatively larger thermal heating spot and where the size of the write bubble is determined mainly by the magnetic field or a combination of the magnetic field and thermal heat spot, and which are generally called large-spot thermally assisted magnetic recording, as is well known in the art. In what concerns the current invention, the behavior of the write bubble of large-spot thermally assisted magnetic recording can be considered to be substantially similar to what has been discussed for magnetic recording without thermal assist. In all of these recording system, servo electronics are used to keep the read and write heads at the proper radial location relative to the data tracks. The servo system generates a position error signal and uses this to determine the location of the head over the data track or tracks of interests and then makes adjustments to the radial position of the head as needed to maintain the correct position. However, referring back to FIG. 1, it can be seen that adjusting the location of the head involves moving the slider 113 suspension 115, and actuator arm 119, all of which posses a certain amount of mass. Therefore, moving this mass requires a certain amount of time and cannot be done instantaneously. If the head does get off-track, an unacceptable loss of data can occur before the head is brought back into alignment. For example, while the head is off-track the write head can be interfering with adjacent, previously recorded tracks of data. What's more, this problem exists for any of the above described methods of data recording.

The present invention overcomes this problem, providing a fine tuning of the servo system by a means that is not affected by the mass of any component and which is, therefore, virtually instantaneous. This invention prevents the write head from inadvertently writing to adjacent data tracks when the head is off-track, allowing time for the servo electronics to bring the head back into alignment.

Figure 8:
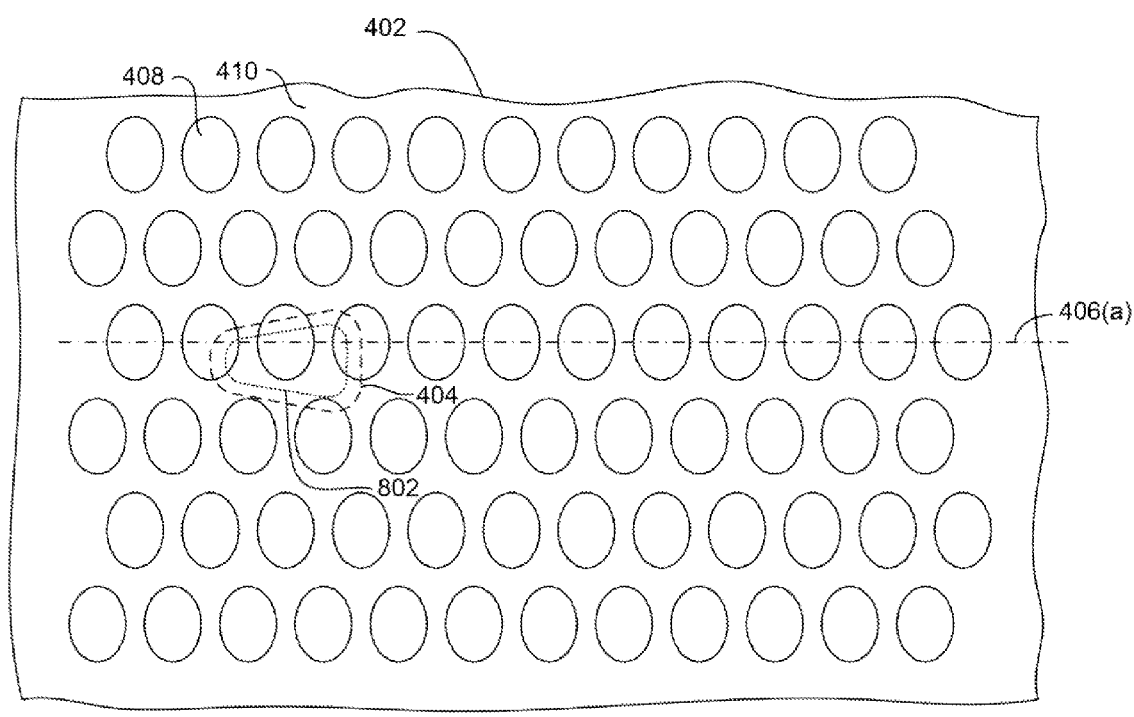
FIG. 8 is a top down view of a portion of a bit patterned media illustrating an implementation of the present invention.

With reference to FIG. 8, the invention will be described in terms of a system employing single track recording on a bit patterned media such as was described above with reference to FIG. 4. FIG. 8 shows a situation wherein the write bubble 404 is offset from the intended data track 406(a) because the write head 202 (FIG. 2) has moved away from the intended position over the data track 406(a). As a result, the write bubble 404 has started to encroach on a data island of the adjacent data track 406(b). This of course would lead to the loss of data previously recorded on the adjacent data track 406(b). Also, as discussed above, because of the mass of the slider 113 and other related components (FIG. 1) moving the write bubble 404 back over the intended track 406(a) and away from the adjacent data track 406(b) would take some time. In the time that it takes to move the write bubble back into proper alignment over the data track 406(a) the write bubble may have passed over many of the data islands of the 406(b), resulting in significant data loss.

However, while the write head 202 is misaligned in this way, the power to the coil 210 of the write head 200 (FIG. 2) can be reduced. This results in the size of the write bubble shrinking as indicated by dotted line 802 in FIG. 8. As can be seen, this reduces size write bubble 808 can be reduced sufficiently that it does not encroach on a data island of the adjacent data track. What's more, because this is a mass-less process (i.e. it does not require the movement of any physical components) it can be performed virtually instantaneously, greatly reducing the loss of data on adjacent data track 406(b). Once the read head 202 has been moved back into proper position over the desired data track 406(a) the power to the coil 210 of the write coil 200 (FIG. 2) can be again increased to provide a stronger write field and larger write bubble 404.

While the above described an application of the invention with regard to a single track recording system, this same process can be applied to a data hyper-data track recording system such as that described above with reference to FIG. 5. For example in FIG. 9, the write bubble 502 has moved out of alignment over the desired data tracks 406(a) and 406(b) so that it is encroaching on an adjacent data track 406(c). As with the above described approach, the power to the write coil 210 of the write head 200 (FIG. 2) is reduced to reduce the size of the write bubble as indicated by dotted line 902, thereby moving the write bubble out of the data track 406(c).

The above described solution can also be applied to a shingled magnetic recording system as described above with reference to FIG. 6. In fact the present invention is particularly suited to application to a shingled recording system, for which the primary factors affecting on-track error rates are the positions of the trailing edge and just one side of the write bubble 602. In shingled recording, the remaining side of the write bubble 602 is less critical in terms of its contours. The fact that modulating the write field tends to move the two side contours in different directions (a "breathing" type behavior in terms of the full contour) is of little consequence, and the system can be optimized to position the side contours properly on just one side. As shown in FIG. 6, then, when the write bubble 602 moves away from its intended data track 406(a) toward an adjacent data track 406(b), the size of the write bubble 602 can be reduced as shown by dotted line 1002. Again, this can be achieved by reducing power to the write coil 210 of the write head 200. This moves the write bubble 1002 away from the adjacent data track 406(b) as shown.

Figure 11:
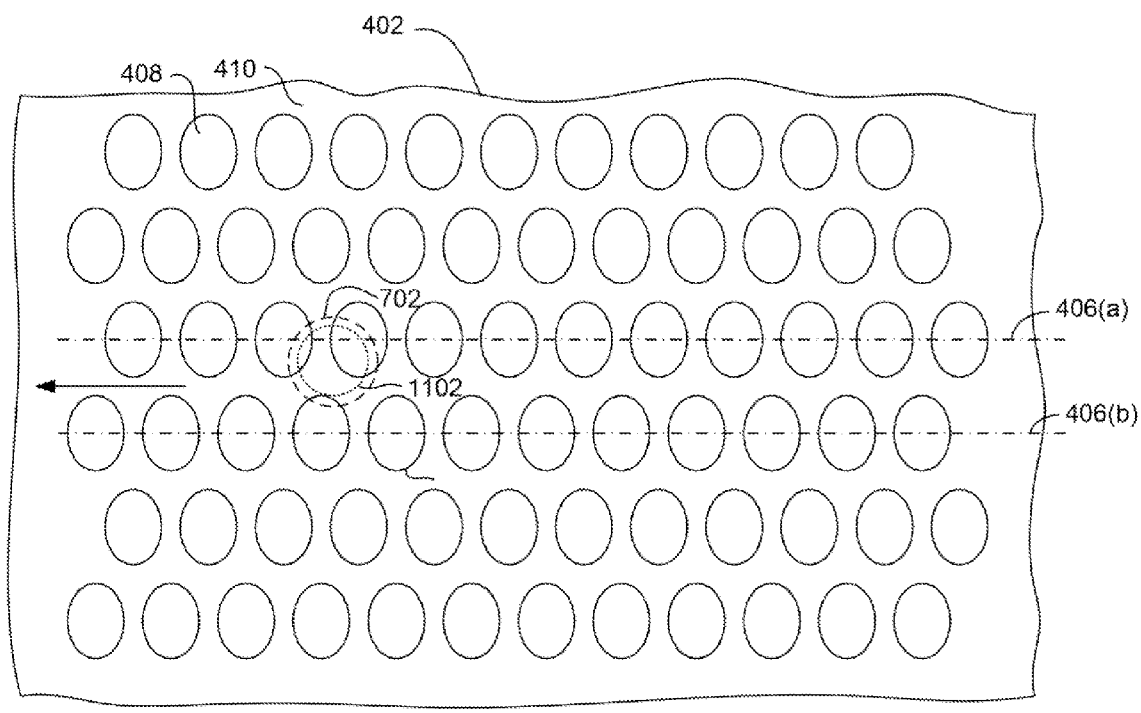
FIG. 11 is a top down view of a portion of a bit patterned media illustrating an implementation of the present invention in a thermally assisted recording system.

In addition to the above systems, a similar technique can be applied to a thermally assisted recording system. FIG. 11 shows a magnetic media of a thermally assisted magnetic recording system, wherein the write bubble 702 has moved out of alignment with the intended data track 406(a) toward an adjacent data track 406(b). However, in this system, the size of the write bubble is affected not only by the power to the write coil 210 (FIG. 2), but also by the power to the heating element (not shown). Therefore, in order to reduce the size of the write bubble, 702, the power to the heating element can be reduced to reduce the amount of heating to the media. This can be in addition to, or in lieu of reducing the power to the coil 210 of the write head 200 (FIG. 2). As with the other embodiments of the invention, the write bubble reduces to a size indicated by dotted line 1102, moving the write bubble out of the adjacent data track 406(a) thereby preventing inadvertent writing to the adjacent data track.

While the invention can be applied to bit patterned media, as described above, the invention can also be applied to other recording processes, such as those using a continuous media or a system using a track patterned media, wherein the data track is patterned as continuous concentric rings on the media. The invention can also be applied to microwave assisted magnetic recording (MAMR) wherein the slider includes a microwave oscillator such as a spin torque oscillator, which is used to temporarily reduce the magnetic coercivity of the magnetic media to improve writability.

For a microwave assisted magnetic recording system (MAMR), the invention additionally can use a modulation of the intensity and/or frequency of the microwave field, since these variables, in addition to magnetic field strength, will affect the size of the write bubble. In such a system, both the write current and the frequency of the microwave source (such as a spin torque oscillator) can be modulated to control the size of the write bubble based on the instantaneous position error signal (PES). Changing the frequency of the microwave field affects the size of the write bubble due to the tuning of resonance conditions. Additionally, the intensity of the microwave field may be modulated by the PES. Optionally, in cases where the writability of the MAMR media is largely governed by the microwave field, only the intensity and/or frequency of the microwave field may be modulated by the PES.

Figure 9:
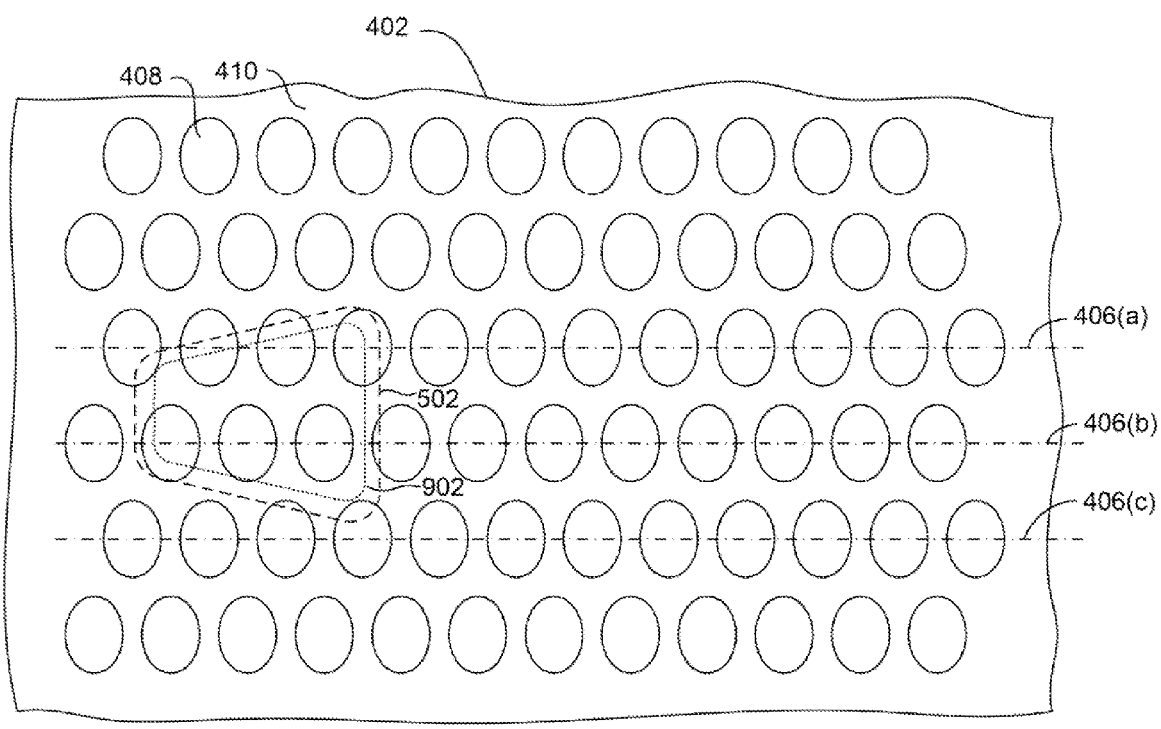
FIG. 9 is a top down view of portion of a bit patterned media illustrating an implementation of the present invention in a hyper-track data recording system.
Figure 10:
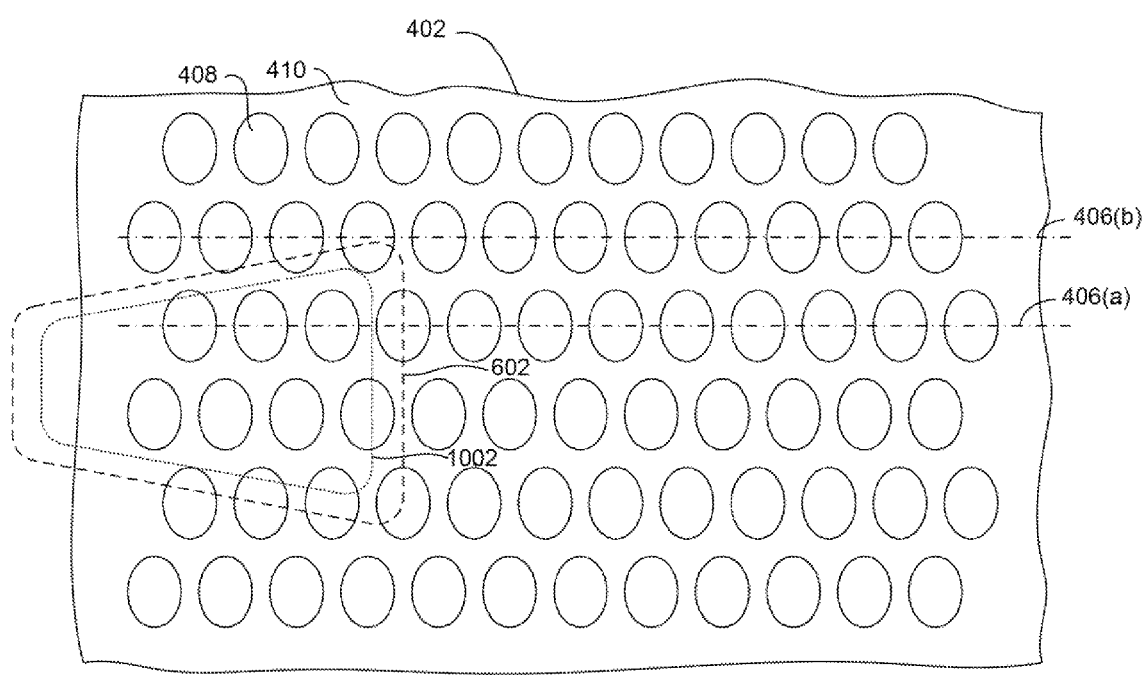
FIG. 10 is a top down view of a portion of a bit patterned media illustrating an implementation of the present invention in a shingled magnetic data recording system.
Figure 12:
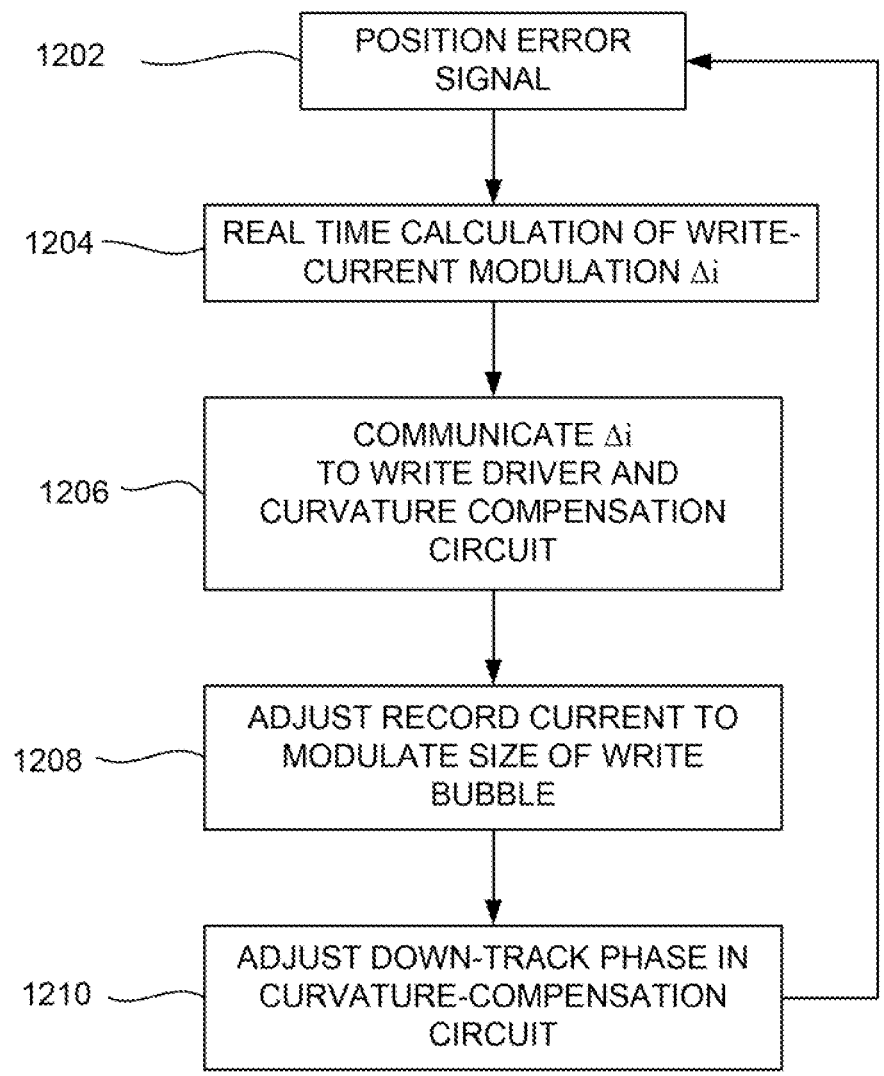
FIG. 12 is a flowchart, schematically illustrating a method of the present invention.

FIG. 12 is a flowchart illustrating a method for modulating the size of the write bubble in a data recording system that does not employ thermally assisted recording nor microwave assisted recording (e.g. systems discussed with reference to FIGS. 8, 9 and 10). With reference to FIG. 12, in a step 1202 a position error signal (PES) is generated. Then, in a step 1204, a real time calculation of write current modulation $\Delta i$ is determined based on the PES. Then, in a step 1206, the $\Delta i$ is communicated to the write head driver circuitry and curvature compensation circuitry. Then, in a step 1208, the recording current (write current) is adjusted to modulate the size of the write bubble. Then, in a step 1210, an adjustment is made to the down-track phase in the curvature-compensation circuitry. The process then returns to step 1202 to re-calculate the position error signal.

The process implements methods whereby the instantaneous position-error signal (PES) is sampled at sampling rates depending on the head velocity, repeatable runout (RRO), non-repeatable runout (NRRO), etc. to establish the instantaneous position of the head relative to the nominal center of the track. This information is converted to a change $\Delta i$ in the recording current depending on the PES. For example, if it is determined that the head is moving radially toward the adjacent track, the record current is reduced to shrink the lateral extent of the write bubble and thereby protecting the islands of the adjacent track. The change $\Delta i$ is also communicated to the curvature compensation circuit to compute an adjustment to the down-track phase to maintain good downtrack synchronization.

Figure 13:
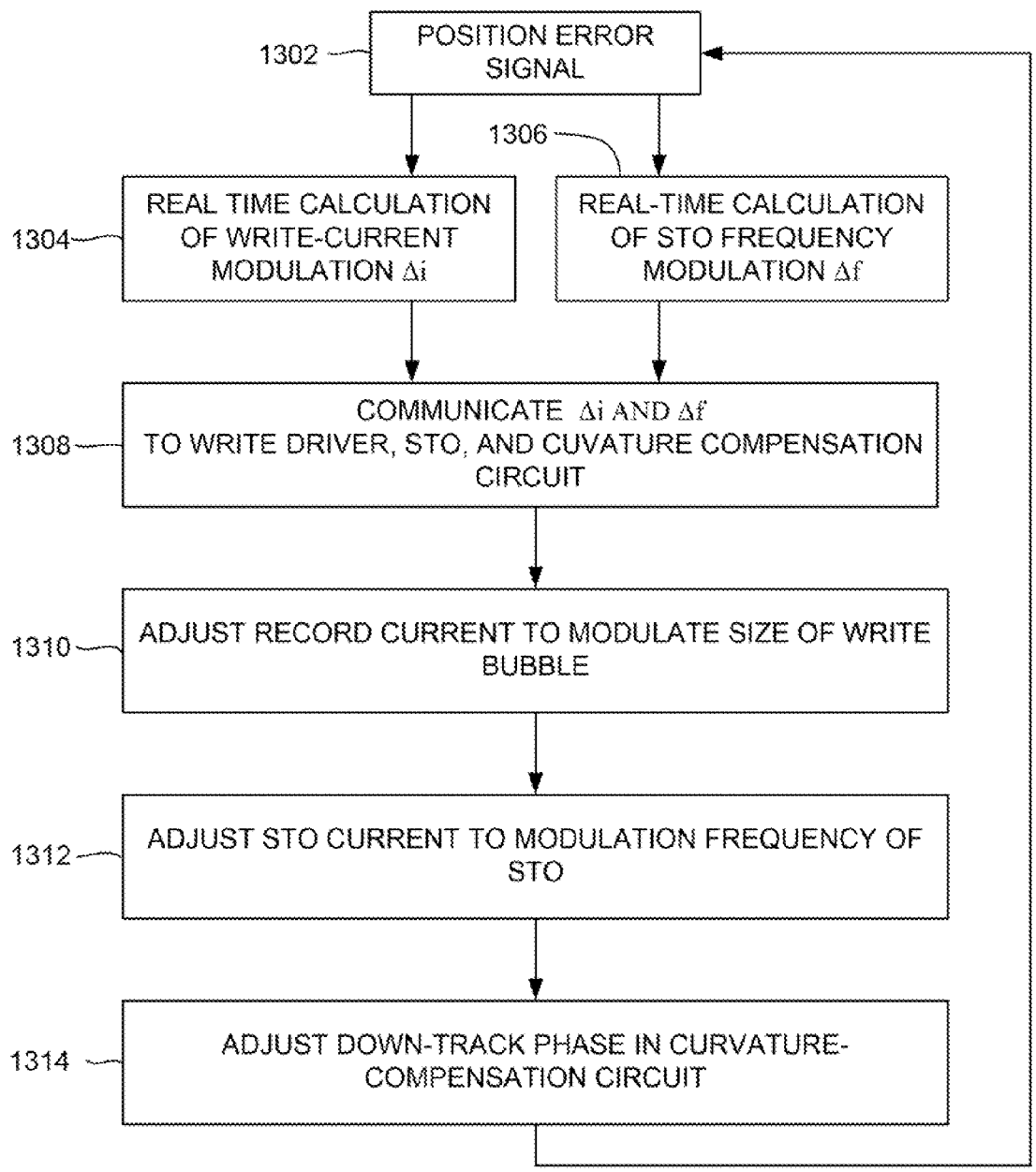
FIG. 13 is a flowchart, schematically illustrating a method according to an alternate embodiment of the present invention.

For use in a MAMR system, the invention can use a modulation of the intensity and or frequency of the microwave field, since these variables, in addition to magnetic field strength, will affect the position of the write field probability contours (e.g. write bubble). FIG. 13, is a flowchart illustrating a process for use in a microwave assisted magnetic recording system (MAMR) that employs a spin torque oscillator, wherein both recording current and oscillation frequency are used to modulate the size of the write bubble. First, in a step 1302 a position error signal is calculated. Then, in simultaneous steps 1304, 1306 a real time calculation is made of write current modulation Δi, and a real-time calculation is made of spin torque oscillation frequency modulation Δf. Then, in a step 1308, the Δi and Δf are communicated to the write driver and curvature compensation circuitry. Then, in a step 1310 an adjustment is made to the record current to modulate the size of the write bubble. Then, in a step 1312 and adjustment is made to the STO current to modulate the frequency of the STO. Then, in step 1314 an adjustment is made to the down-track phase in the curvature compensation circuitry. The process then returns to step 1302 to re-calculate the position error signal.

Figure 14:
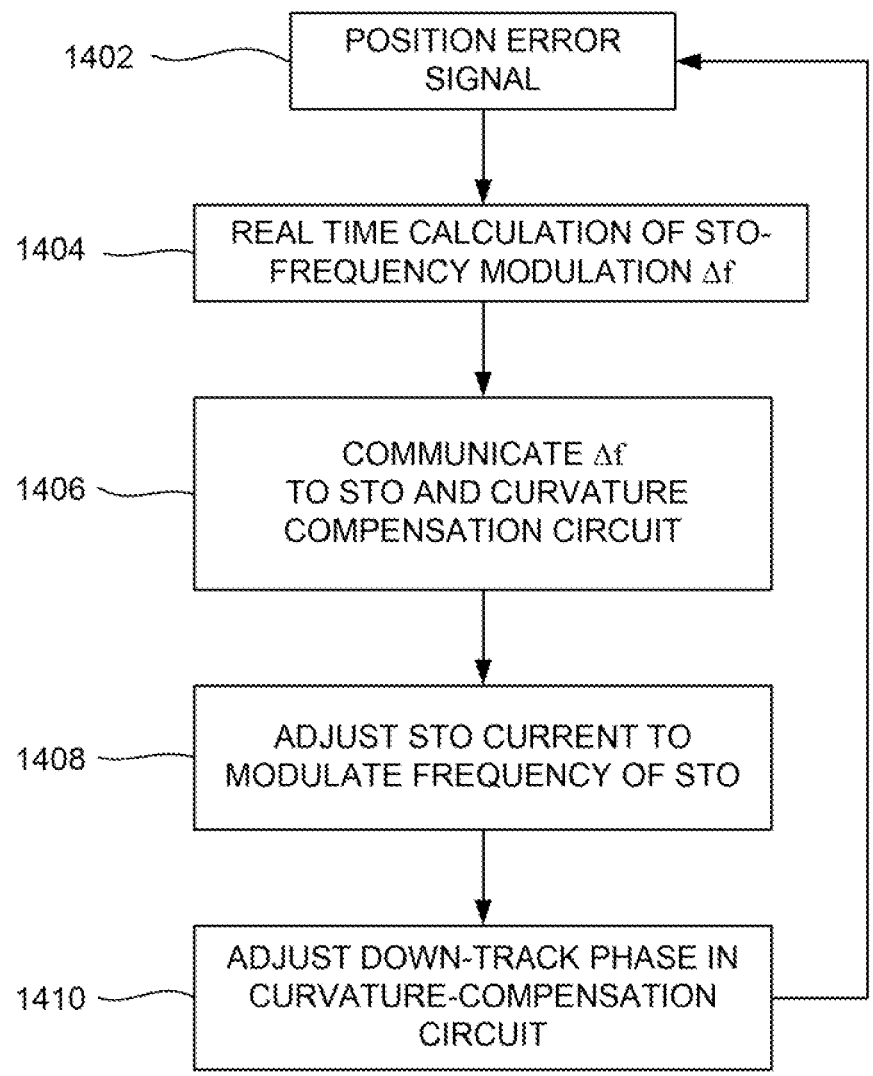
FIG. 14 is a flowchart, schematically illustrating a method according to another embodiment of the invention.

In cases where the writability of the MAMR media is governed largely by the microwave field, only the intensity and/or frequency of the microwave field may be modulated by the PES. FIG. 14 is a flowchart illustrating a process that can be used with a microwave assisted recording (MAMR) recording system, wherein only oscillation frequency is modulated to adjust the size of the write bubble. First in a step 1402 a position error signal is generated. Then, in a step 1404 a real-time calculation is made of the spin torque oscillation frequency modulation Δf. Then, in a step 1406, the Δf is communicated to the spin torque oscillator and curvature compensation circuitry. Then, in a step 1408 the current to the spin torque oscillator is adjusted to modulate the frequency of the spin torque oscillator. Then, in a step 1410 the down-track phase in the curvature-compensation circuit is adjusted. The process then returns to step 1402 to re-calculate the position error signal.

Figure 15:
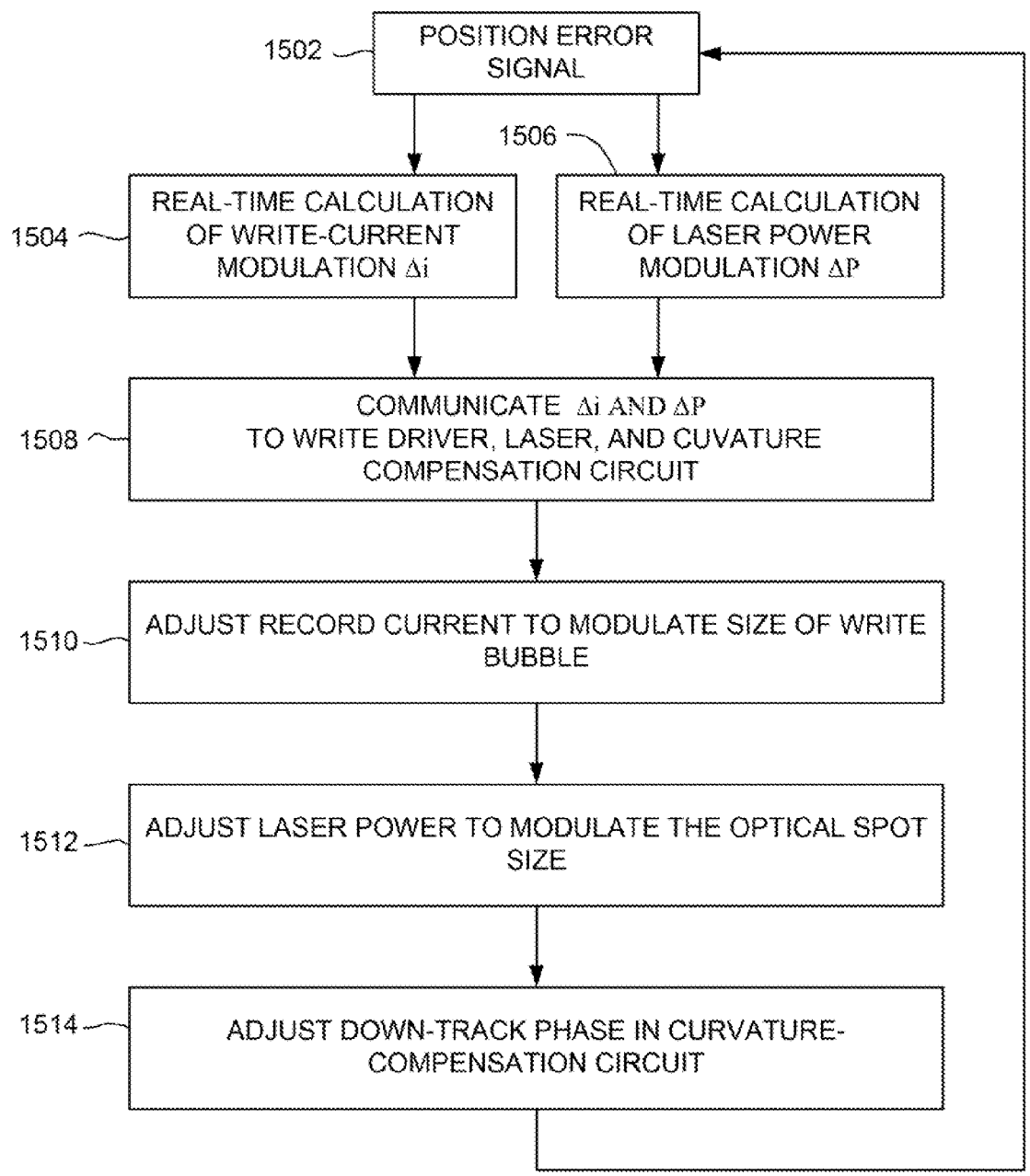
FIG. 15 is a flowchart, schematically illustrating a method according to yet another embodiment of the invention.

FIG. 15 is a flowchart illustrating a process for modulating a write bubble in a thermally assisted recording (TAR) system, wherein both write current and heat element power are adjusted to modulate the size of the write bubble. First, in a step 1502 a position error signal is generated. Then, in steps 1504 and 1506, a real-time calculation is made of write-current modulation Δi and laser power modulation Δp. Then, in a step 1508, Δi and Δp are communicated to the write driver, laser, and curvature compensation circuit. Then, in a step 1510 the recording current (write current) is adjusted to modulate the size of the write bubble. Then, in step 1512 an adjustment is made to the laser power to modulate the optical spot size. Then, in a step 1514 the down-track phase is adjusted in the curvature-compensation circuit. The process then returns to step 1502 to re-calculate the position error signal.

Figure 16:
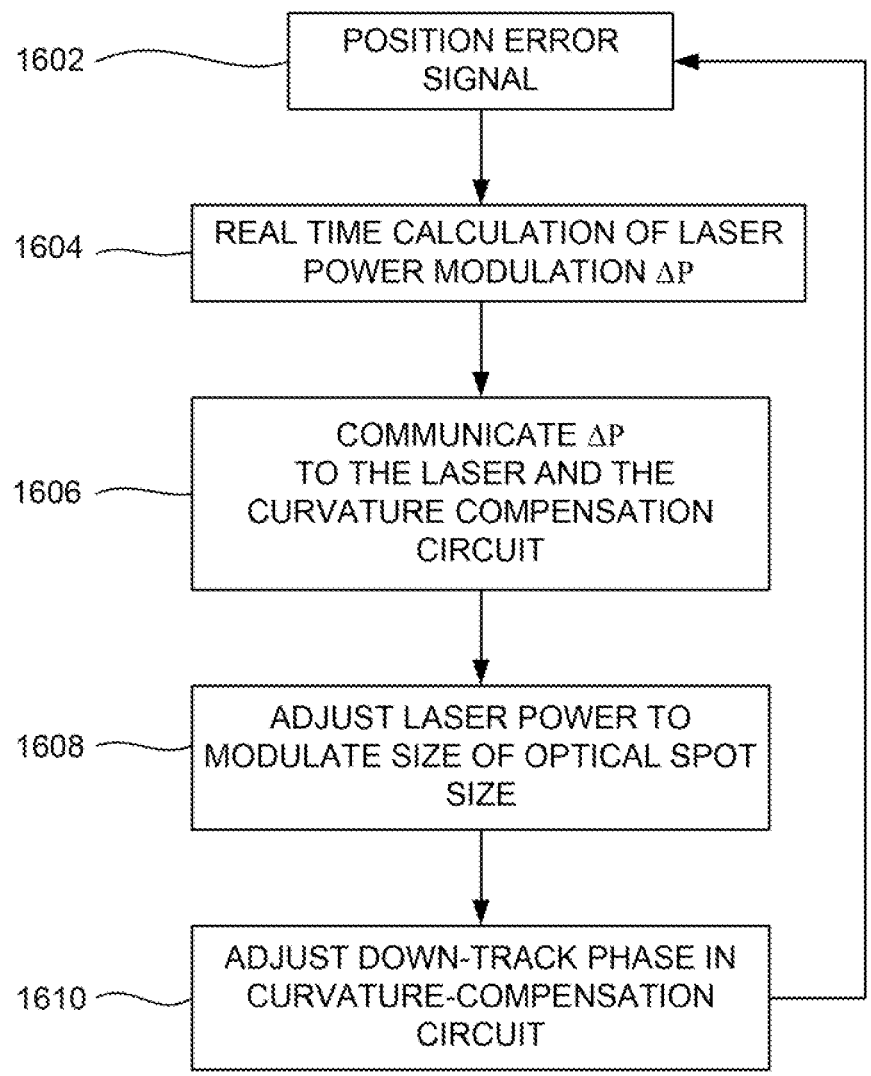
FIG. 16 is a flowchart, schematically illustrating a method according to still another embodiment of the invention.

FIG. 16 is a flowchart illustrating a process for modulating a write bubble size in a thermally assisted recording system wherein only the laser power is adjusted. First in a step 1602 a position error signal is calculated. Then, in a step 1604 a real-time calculation of the laser power modulation Δp is made. Then, in a step 1606 the Δp is communicated to the laser and the curvature compensation circuit. Then, in a step 1608 the laser power is adjusted to modulate the size of the optical spot. Then, in a step 1610 an adjustment is made to the town-track phase in the curvature-compensation circuit. The process then returns to step 1602 to recalculate the position error signal.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method for preventing adjacent track interference during writing, comprising:
    generating a position error signal;
    calculating a write current modulation based on the position error signal; and
    adjusting a write current and a microwave field from a magnetic oscillator to modulate the size of a write bubble.

2. The method as in claim 1 further comprising after calculating the write current modulation, communicating the current modulation to a write driver and to curvature compensation circuitry.

3. The method as in claim 1 further comprising adjusting a down-track phase in curvature compensation circuitry.

4. A method for preventing adjacent track interference in a magnetic data recording system, comprising: generating a position error signal; and modulating a size of a write bubble based on the position error signal to avoid writing to an adjacent data track; wherein the size of the write babble is modulated by adjusting power delivered to a microwave oscillator.

5. The method as in claim 4 wherein the size of the write bubble is modulated by adjusting power delivered to a write coil of a magnetic write head.

6. The method as in claim 4 wherein the microwave oscillator is a spin torque oscillator.

7. The method as in claim 4 wherein the size of the write bubble is modulated by adjusting power to a write coil of a magnetic write head and adjusting power to the microwave oscillator.

8. The method as in claim 4 wherein the size of the write bubble is also modulated by adjusting power to a heating element.

9. The method as in claim 4 wherein the size of the write bubble is also modulated by adjusting power to a write coil of a magnetic write head and by adjusting power to a heating element.

10. A magnetic data recording system, comprising: a magnetic media having a plurality of data tracks; a slider having a magnetic read head and a magnetic write head formed thereon; an actuator connected with the slider to position the slider over a surface of the magnetic media; circuitry configured to generate a position error signal based on a signal from the read head; circuitry configured to calculate a write bubble modulation based on the position error signal; a microwave oscillator; and circuitry for adjusting power delivery to the microwave oscillator in order to modulate the write bubble based on the calculated write bubble modulation; wherein the magnetic data recording system is configured for hyper-track recording.

11. The magnetic data recording system as in claim 10 further comprising circuitry for adjusting power delivery to the magnetic write head in order to modulate the write bubble based on the calculated write bubble modulation.

12. The magnetic data recording system as in claim 10 further comprising:
    a heating element; and
        circuitry for adjusting power delivery to the heating element in order to modulate the write bubble based on the calculated write bubble modulation.

13. The magnetic data recording system as in claim 10 further comprising:
    a heating element; and
    circuitry for adjusting power delivery to the heating element and to the write head to modulate the write bubble based on the calculated write bubble modulation.

14. The magnetic data recording system as in claim 10 further comprising:

circuitry for calculating a write current modulation based on the position error signal;

circuitry for communicating the write current modulation to a write driver and to a curvature compensation circuit.

15. The magnetic data recording system as in claim 10 further comprising circuitry for adjusting a down-track phase in a curvature compensation circuit.

16. The magnetic data recording system as in claim 10 wherein the magnetic media is a bit patterned media.

17. The magnetic data recording system as in claim 10 wherein the magnetic data recording system is configured for shingled recording.

\* \* \* \* \*